US008981589B2

(12) United States Patent
Lienkamp et al.

(10) Patent No.: US 8,981,589 B2
(45) Date of Patent: Mar. 17, 2015

(54) SWITCHED BATTERY AND CAPACITOR ARRANGEMENT AND RELATED OPERATING METHODS

(75) Inventors: Sebastian Lienkamp, Budenheim (DE); Peter Kilian, Darmstadt (DE); Stephen Raiser, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 576 days.

(21) Appl. No.: 13/204,547

(22) Filed: Aug. 5, 2011
(Under 37 CFR 1.47)

(65) Prior Publication Data

US 2012/0133203 A1 May 31, 2012

Related U.S. Application Data

(60) Provisional application No. 61/376,605, filed on Aug. 24, 2010.

(51) Int. Cl.
*B60L 1/00* (2006.01)
*B60L 11/18* (2006.01)
(Continued)

(52) U.S. Cl.
CPC ............... *B60L 11/1861* (2013.01); *B60L 7/14* (2013.01); *B60L 11/005* (2013.01);
(Continued)

(58) Field of Classification Search
CPC .................................................. Y02T 10/7005
USPC ......... 307/9.1, 10.1, 124, 125, 139, 140, 115, 307/19, 22, 31, 38, 107, 108, 112, 113; 323/225, 271, 272; 363/95, 97, 98, 363/131, 132; 320/138, 103, 104, 166, 167
See application file for complete search history.

(56) References Cited

U.S. PATENT DOCUMENTS

| 4,864,479 | A | * | 9/1989 | Steigerwald et al. | ............ 363/17 |
| 6,037,745 | A | * | 3/2000 | Koike et al. | ................... 320/104 |

(Continued)

FOREIGN PATENT DOCUMENTS

| CN | 101420137 A | 4/2009 |
| CN | 101544197 A | 9/2009 |

(Continued)

OTHER PUBLICATIONS

State Intellectual Property Office of the Peoples' Republic of China, Office Action mailed Jan. 15, 2014 for Chinese Patent Application No. 201110305360.9.

(Continued)

*Primary Examiner* — Jared Fureman
*Assistant Examiner* — Carlos Laguerre
(74) *Attorney, Agent, or Firm* — Ingrassia Fisher & Lorenz, P.C.

(57) ABSTRACT

Systems and methods are provided for regulating the state of charge of a battery. An exemplary electrical system includes a fuel cell coupled to a bus and a battery coupled to the bus via a switching arrangement coupled to a capacitor. An exemplary method for operating the electrical system involves operating the switching arrangement such that a voltage of the battery is substantially equal to a voltage of the fuel cell when a state of charge of the battery is greater than a lower threshold value and less than an upper threshold value, and operating the switching arrangement to couple the capacitor electrically in series between the battery and the bus when the state of charge of the battery is not between the lower threshold value and the upper threshold value.

18 Claims, 3 Drawing Sheets

(51) Int. Cl.
*B60L 7/14* (2006.01)
*B60L 11/00* (2006.01)
*H02J 7/34* (2006.01)

(52) U.S. Cl.
CPC ........ B60L 11/1803 (2013.01); B60L 11/1887 (2013.01); H02J 7/345 (2013.01); *B60L 2240/547* (2013.01); *B60L 2240/549* (2013.01); *Y02T 10/7022* (2013.01); *Y02T 10/7044* (2013.01); *Y02T 10/705* (2013.01); *Y02T 90/34* (2013.01)
USPC ............... 307/9.1; 307/10.1; 307/19; 307/22; 307/31; 307/38; 307/107; 307/108; 307/112; 307/113; 307/115; 307/124; 307/125; 307/139; 307/140; 323/225; 323/271; 323/272; 363/95; 363/97; 363/98; 363/131; 363/132; 320/138; 320/103; 320/104; 320/166; 320/167

(56) References Cited

U.S. PATENT DOCUMENTS

| | | | |
|---|---|---|---|
| 6,160,374 A * | 12/2000 | Hayes et al. | 320/108 |
| 6,177,736 B1 | 1/2001 | Raiser | |
| 6,323,626 B1 | 11/2001 | Raiser | |
| 6,337,557 B1 | 1/2002 | Kates et al. | |
| 6,429,613 B2 | 8/2002 | Yanase et al. | |
| 7,427,450 B2 | 9/2008 | Raiser | |
| 7,450,401 B2 * | 11/2008 | Iida | 363/16 |
| 7,638,904 B2 * | 12/2009 | Shoji et al. | 307/154 |
| 7,764,527 B2 * | 7/2010 | Takayanagi | 363/65 |
| 2002/0054498 A1 * | 5/2002 | Cho et al. | 363/132 |
| 2003/0039129 A1 * | 2/2003 | Miyazaki et al. | 363/26 |
| 2004/0009380 A1 | 1/2004 | Pearson | |
| 2005/0174817 A1 * | 8/2005 | Schmidt et al. | 363/97 |
| 2006/0006832 A1 * | 1/2006 | Kitajima et al. | 318/800 |
| 2006/0035115 A1 | 2/2006 | Norimatsu et al. | |
| 2006/0127704 A1 * | 6/2006 | Raiser | 429/9 |
| 2006/0238033 A1 | 10/2006 | Raiser et al. | |
| 2007/0278059 A1 | 12/2007 | Afriat | |
| 2008/0094042 A1 * | 4/2008 | Ferrario | 323/234 |
| 2008/0272718 A1 * | 11/2008 | Marquardt | 318/139 |
| 2009/0108798 A1 * | 4/2009 | Schulz et al. | 318/802 |
| 2010/0078997 A1 | 4/2010 | Chen et al. | |
| 2010/0090525 A1 | 4/2010 | King et al. | |
| 2010/0090533 A1 * | 4/2010 | Shimada et al. | 307/66 |
| 2010/0102635 A1 | 4/2010 | Chen et al. | |
| 2010/0219794 A1 * | 9/2010 | Sugimoto et al. | 320/128 |
| 2010/0259955 A1 * | 10/2010 | Shimada | 363/49 |
| 2011/0144861 A1 * | 6/2011 | Lakirovich et al. | 701/36 |
| 2012/0155130 A1 * | 6/2012 | Hosini et al. | 363/64 |

FOREIGN PATENT DOCUMENTS

| | | |
|---|---|---|
| CN | 201414016 Y | 2/2010 |
| DE | 112005003104 T5 | 10/2007 |
| DE | 102010021402 A1 | 12/2011 |

OTHER PUBLICATIONS

German Patent and Trade Mark Office, Office Action in German Patent Application No. 10 2011 081 182.6, mailed Nov. 26, 2014.

* cited by examiner

SWITCHED BATTERY AND CAPACITOR ARRANGEMENT AND RELATED OPERATING METHODS

CROSS REFERENCE TO RELATED APPLICATIONS

This application claims the benefit of U.S. Provisional Application No. 61/376,605, filed Aug. 24, 2010.

TECHNICAL FIELD

Embodiments of the subject matter described herein relate generally to electrical systems in automotive vehicles, and more particularly, embodiments of the subject matter relate to systems and methods for regulating the state of charge of an energy storage element such as a battery.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles. Many of the electrical components share a common direct current (DC) voltage bus. The DC voltage bus (alternatively referred to as a high voltage DC bus, a power bus, or an electrical bus) is configured to carry DC power from one or more DC power sources in the vehicle to numerous other electrical components in the vehicle, such as power inverters, air compressors, power converters, auxiliary power modules, and the like.

A fuel cell (or fuel cell stack) is one DC power source that may be connected to the DC voltage bus for providing DC power to other electrical components in the vehicle. Due to internal resistances and/or ohmic losses and other operating characteristics of the fuel cell, heavy loading conditions and/or startup of the vehicle often requires power in excess of what the fuel cell can provide. Accordingly, a battery (or rechargeable battery pack) is often employed to provide supplemental power during heavy loading conditions and/or startup as well as to store regenerative energy from the drive unit of the vehicle. However, many batteries are unable to accommodate large voltage swings of the fuel cell during operation. Some prior art systems utilize a bi-directional DC/DC converter to step up the voltage from the battery to match the DC voltage bus voltage dictated by the voltage output of the fuel cell, or alternatively, to step down the fuel cell voltage during battery recharging. DC/DC converters are relatively large, costly and heavy, providing obvious disadvantages.

BRIEF SUMMARY

In accordance with one embodiment, an electrical system for a vehicle is provided. The electrical system comprises a capacitive element, a switching arrangement coupled to the capacitive element, the switching arrangement being configured to be coupled between a rail of a bus and an energy storage element, and a control module coupled to the switching arrangement and the energy storage element. The control module is configured to operate the switching arrangement such that a voltage of the energy storage element is substantially equal to a voltage of the rail of the bus when a state of charge of the energy source is greater than a lower threshold value and less than an upper threshold value. The control module is further configured to operate the switching arrangement to add a voltage of the capacitive element to the voltage of the energy storage element when the state of charge of the energy storage element is greater than the upper threshold value. The control module is further configured to operate the switching arrangement to subtract the voltage of the capacitive element from the voltage of the energy storage element when the state of charge of the energy storage element is less than the lower threshold value.

In another embodiment, a method is provided for operating an electrical system in a vehicle. The electrical system comprises a fuel cell coupled to a bus and a battery coupled to the bus via a switching arrangement coupled to a capacitor. The method comprises operating the switching arrangement such that a battery voltage of the battery is substantially equal to a fuel cell voltage of the fuel cell when a state of charge of the battery is greater than a lower threshold value and less than an upper threshold value, operating the switching arrangement to couple the capacitor electrically in series between the battery and the bus when the state of charge of the battery is less than the lower threshold value, and operating the switching arrangement to couple the capacitor electrically in series between the battery and the bus when the state of charge of the battery is greater than the upper threshold value.

In accordance with yet another embodiment, an electrical system is provided. The electrical system comprises a bus comprising a positive rail and a negative rail, a battery having a positive terminal and a negative terminal coupled to the negative rail of the bus, and a capacitor having a positive terminal and a negative terminal. A first switching element is coupled between the positive terminal of the capacitor and the positive rail of the bus, and the first switching element is configured to allow current from the positive terminal of the capacitor to the positive rail when the first switching element is closed. A second switching element is coupled between the negative terminal of the capacitor and the positive rail of the bus, and the second switching element is configured to allow current from the positive rail to the negative terminal of the capacitor when the second switching element is closed. A third switching element is coupled between the positive terminal of the capacitor and the positive terminal of the battery, and the third switching element is configured to allow current from the positive terminal of the capacitor to the positive terminal of the battery when the third switching element is closed. A fourth switching element is coupled between the negative terminal of the capacitor and the positive terminal of the battery, and the fourth switching element is configured to allow current from the positive terminal of the battery to the negative terminal of the capacitor when the fourth switching element is closed.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements, additional intervening elements, devices, features, or components may be present in an embodiment of the depicted subject matter. In addition, certain terminology may also be used in the following description for the purpose of reference only, and thus is not intended to be limiting. The terms "first", "second" and other such numerical terms referring to structures do not imply a sequence or order unless clearly indicated by the context.

For the sake of brevity, conventional techniques related to analog circuit design, signaling, sensing, transistor-based switching, electrical energy and/or power conversion, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate generally to systems and methods for coupling an energy storage element, such as a battery (or another suitable energy storage element), to a DC voltage bus without a DC/DC converter. A switching arrangement is coupled to a capacitive element, such as an ultracapacitor, which may be interposed between the battery and the DC voltage bus. The switching arrangement is operated in a manner that allows the battery to provide supplemental power (or current) and/or receive a charging current during operation of the electrical system, while at the same time ensuring the state of charge (SOC) of the battery is maintained within a predetermined range, that is, between a lower SOC limit and an upper SOC limit. In this regard, as described in greater detail below, the switching arrangement is operated in a manner that interposes the capacitive element electrically in series between the battery and the DC voltage bus when the SOC of the battery is not within the predetermined range, and effectively alternates the polarity of the capacitor such that the combination of the open circuit voltage of the battery and the capacitor voltage is substantially equal to the DC bus voltage.

Figure 1:
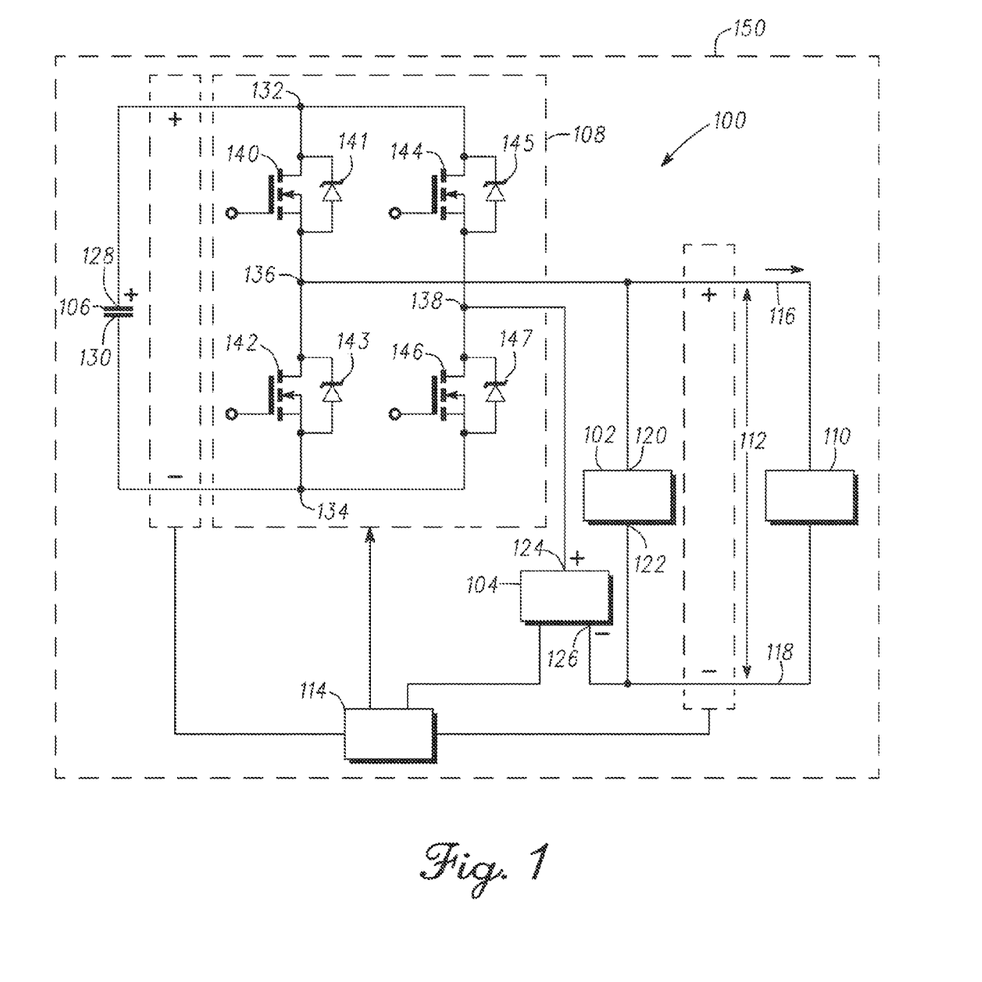
FIG. 1 is a schematic view of an electrical system suitable for use in a vehicle in accordance with one embodiment.

FIG. 1 depicts an exemplary embodiment of an electrical system 100 suitable for use in a vehicle 150, such as, for example, a fuel cell vehicle and/or hybrid vehicle. The electrical system 100 includes, without limitation, a fuel cell 102, an energy storage element 104, a capacitive element 106, a switching arrangement 108, and an electrical load 110. The various elements of the electrical system 100 are coupled to a bus 112, which may be referred to herein as a DC voltage bus, a power bus, a common (or shared) bus, or an electrical bus. In an exemplary embodiment, the electrical system 100 further includes a control module 114 suitably configured to support operation of the electrical system 100, as described in greater detail below. It should be understood that FIG. 1 is a simplified representation of an electrical system 100 for purposes of explanation and is not intended to limit the scope or applicability of the subject matter described herein in any way.

In an exemplary embodiment, the bus 112 comprises a positive rail 116 coupled to a positive terminal 120 of the fuel cell 102 and a negative rail 118 coupled to a negative terminal 122 of the fuel cell 102 to establish a voltage potential difference between the positive rail 116 and the negative rail 118 in a conventional manner as described below. In this regard, the bus voltage (e.g., the voltage potential between the positive rail 116 and the negative rail 118) is equal to the voltage across the terminals 120, 122 of the fuel cell 102 (denoted by $V_{FC}$ and alternatively referred to herein as the fuel cell voltage) and fluctuates depending on the amount of current flowing to/from the electrical load 110 ($i_L$) which is coupled to both rails 116, 118 of the bus 112. A negative terminal 126 of the energy storage element 104 is coupled to the negative rail 118 and a positive terminal 124 of the energy storage element 104 is coupled to the switching arrangement 108. The switching arrangement 108 is coupled to the positive rail 116 such that the positive terminal 124 of the energy storage element 104 is coupled to the positive rail 116 of the bus 112 via the switching arrangement 108. The switching arrangement 108 is coupled to the capacitive element 106 and the control module 114 is configured to operate the switching arrangement 108 such that the capacitive element 106 is selectively interposed electrically in series between the positive terminal 124 of the battery 104 and the positive rail 116 of the bus 112.

In an exemplary embodiment, the electrical system 100 is configured such that the bus 112 comprises a high-voltage bus. It should be understood that the phrase "high-voltage" as used herein generally refers to voltage levels or voltage ratings of greater than 60 volts DC (or 30 volts AC). In this regard, in an exemplary embodiment, the fuel cell 102 is realized as one or more fuel cells (e.g., a fuel cell stack) arranged and/or configured electrically in series such that the bus 112 may have a nominal voltage range from about 200 volts to 400 volts. For example, an individual fuel cell may have an idle voltage of about 1 volt, wherein the fuel cell 102 comprises approximately 400 individual fuel cells configured electrically in series to provide an open circuit voltage of about 400 volts. However, due to internal resistances and/or ohmic losses, the voltage across terminals 120, 122 of the fuel cell 102 decreases as the current provided by the fuel cell 102 increases, that is, the fuel cell voltage ($V_{FC}$) and the current provided by the fuel cell 102 are inversely related. For example, a fuel cell 102 having an open circuit voltage of about 400 volts may have a voltage of about 200 volts across its terminals 120, 122 when the fuel cell 102 is providing the maximum amount of current it is capable of providing (e.g., under full rated load).

In an exemplary embodiment, the energy storage element 104 is realized as a rechargeable battery (or rechargeable battery pack). Accordingly, for convenience, but without limitation, the energy storage element 104 may be alternatively referred to herein as a battery. In a similar manner as described above in the context of the fuel cell 102, the voltage across the terminals 124, 126 of the battery 104 (denoted by $V_B$ and alternatively referred to herein as the battery voltage) decreases as the current provided by the battery 104 increases, and conversely, the voltage across the terminals 124, 126 of the battery 104 increases as a charging current to the battery 104 increases (e.g., current into the positive terminal 124 of the battery 104). In an exemplary embodiment, the battery 104 has an open circuit voltage that is greater than the voltage of the fuel cell 102 under full rated load but less than the open circuit voltage of the fuel cell 102. For example, in an exemplary embodiment, where the fuel cell 102 has an open circuit voltage of about 400 volts and a voltage of about 200 volts under full load, the battery 104 has a nominal open circuit voltage of about 300 volts DC. As described in greater detail below, in an exemplary embodiment, during operation of the electrical system 100, the switching arrangement 108 is operated such that the battery 104 either provides supplemental power to the electrical load 110 until reaching a lower SOC limit or receives or otherwise stores regenerative energy (or charging current) from the electrical load 110 (e.g., $i_L<0$) until reaching an upper SOC limit. In this regard, the lower SOC limit and the upper SOC limit are preferably chosen to allow the battery 104 to effectively accommodate heavy loading conditions during operation of the electrical system 100 and/or electrical load 110 while at the same time limiting the SOC swing of the battery 104, thereby improving battery life and/or the reliability of the battery 104. For example, in an exemplary embodiment, the lower SOC limit is preferably around 50% and the upper SOC limit is preferably around 70%, such that the total SOC swing of the battery 104 is about 20%.

In an exemplary embodiment, the capacitive element 106 is realized as one or more individual capacitors (e.g., a capacitor bank). In accordance with one embodiment, the capacitive element 106 is realized as an ultracapacitor (or supercapacitor) having a capacitance of about 500 F. In an exemplary embodiment, the capacitive element 106 is polarized and has a positive terminal 128 coupled to the switching arrangement 108 at node 132 and a negative terminal 130 coupled to the switching arrangement 108 at node 134. For convenience, but without limitation, the capacitive element 106 may be alternatively referred to herein as a capacitor.

In an exemplary embodiment, the switching arrangement 108 comprises a plurality of switching elements and a plurality of diodes suitably configured to allow the voltage across the terminals 128, 130 of the capacitor 106 (denoted by $V_C$ and alternatively referred to herein as the capacitor voltage), to be combined in series with battery voltage to match the voltage between the positive rail 116 and the negative rail 118 of the bus 112 (alternatively referred to herein as the bus voltage). As described above, in an exemplary embodiment, the bus voltage is equal to fuel cell voltage. In this regard, the series combination of the capacitor voltage and the battery voltage is substantially equal to (e.g., within realistic and/or practical operating tolerances and taking into account the voltage drop across switching elements and/or diodes of the switching arrangement 108) the fuel cell voltage.

In the illustrated embodiment, the switching arrangement 108 comprises four switching elements 140, 142, 144, 146 with each switching element having a diode 141, 143, 145, 147 configured antiparallel to the respective switching element. In an exemplary embodiment, the switching elements 140, 142, 144, 146 are transistors, and may be realized using any suitable semiconductor transistor switch, such as a bipolar junction transistor (e.g., an IGBT), a field-effect transistor (e.g., a MOSFET), or another suitable switching device. The switching elements 140, 142, 144, 146 and diodes 141, 143, 145, 147 are antiparallel, meaning a respective switching element and its respective diode are electrically in parallel with reversed or inverse polarity. The antiparallel configuration allows for bidirectional current flow while blocking voltage unidirectionally, as will be appreciated in the art. In this configuration, the direction of current through the respective switching element is opposite to the direction of allowable current through the respective diode.

As shown in FIG. 1, a first switching element 140 of the switching arrangement 108 is coupled between the positive terminal 128 of the capacitor 106 at node 132 and the positive rail 116 of the bus 112 at node 136. In an exemplary embodiment, the first switching element 140 is configured to allow current flow from node 132 to node 136 when it is closed (or ON) and the voltage at node 132 is greater than the voltage at node 136. In this regard, for an N-type device, a collector terminal (for an IGBT implementation) or drain terminal (for a FET implementation) of the first switching element 140 is connected to node 132 and an emitter terminal (for an IGBT implementation) or source terminal (for a FET implementation) of the first switching element 140 is connected to node 136. A first diode 141 is coupled between node 132 and node 136 and configured antiparallel to the first switching element 140, such that the first diode 141 allows current to flow from node 136 to node 132 when the first switching element 140 is open (or OFF) and the voltage at node 136 is greater than the voltage at node 132. In this regard, an anode terminal of the first diode 141 is connected to node 136 and a cathode terminal of the first diode 141 is connected to node 132.

In a similar manner, a second switching element 142 is connected between node 136 and node 134 and configured to allow current to flow from node 136 to node 134 when it is closed and the voltage at node 136 is greater than the voltage at node 134. A second diode 143 is connected between node 134 and node 136 and configured to allow current to flow from node 134 to node 136 when the second switching element 142 is open and the voltage at node 134 is greater than the voltage at node 136. A third switching element 144 is connected between node 132 and node 138 and configured to allow current to flow from node 132 to node 138 when it is closed and the voltage at node 132 is greater than the voltage at node 138. A third diode 145 is connected between node 132 and node 138 and configured to allow current to flow from node 138 to node 132 when the third switching element 144 is open and the voltage at node 138 is greater than the voltage at node 132. A fourth switching element 146 is connected between node 134 and node 138 and configured to allow current to flow from node 138 to node 134 when it is closed and the voltage at node 138 is greater than the voltage at node 134. A fourth diode 147 is connected between node 134 and node 138 and configured to allow current to flow from node 134 to node 138 when the fourth switching element 146 is open and the voltage at node 134 is greater than the voltage at node 138.

In an exemplary embodiment, the electrical load 110 is realized as the electric drive unit for the vehicle 150. In this regard, the electrical load 110 may comprise a power inverter capable of receiving DC voltage (or DC current) from the bus 112 and converting the DC voltage to an AC voltage to drive an electric motor. In an exemplary embodiment, the electrical load 110 and/or electric drive unit is also capable of providing DC current to the bus 112 which may be utilized to charge the battery 104 and/or capacitor 106, for example, during regenerative braking. However, in other embodiments, the electrical load 110 may be realized as an auxiliary power module, an air compressor module, a DC-to-DC converter (or boost converter), a power steering motor driver, or another suitable auxiliary electrical component, or a combination thereof, and the subject matter is not intended to be limited to any particular load coupled to the bus 112.

The control module 114 generally represents the combination hardware, firmware and/or software configured to operate the switching arrangement 108 such that the state of charge of the battery 104 remains within a predetermined range, thereby reducing the SOC swing of the battery 104 and increasing the life and/or reliability of the battery 104. Depending on the embodiment, the control module 114 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this regard, the control module 114 may be realized as a microprocessor, a controller, a microcontroller, a state machine, or the like. The control module 114 may also be implemented as a combination of computing devices, e.g., a combination of a digital signal processor and a microprocessor, a plurality of microprocessors, one or more microprocessors in conjunction with a digital signal processor core, or any other such configuration. In practice, the control module 114 includes processing logic that may be configured to carry out the functions, techniques, and processing tasks associated with the operation of the electrical system 100, as described in greater detail below. Furthermore, the steps of a method or algorithm described in connection with the embodiments disclosed herein may be embodied directly in hardware, in firmware, in a software module executed by the control module 114, or in any practical combination thereof.

Figure 2:
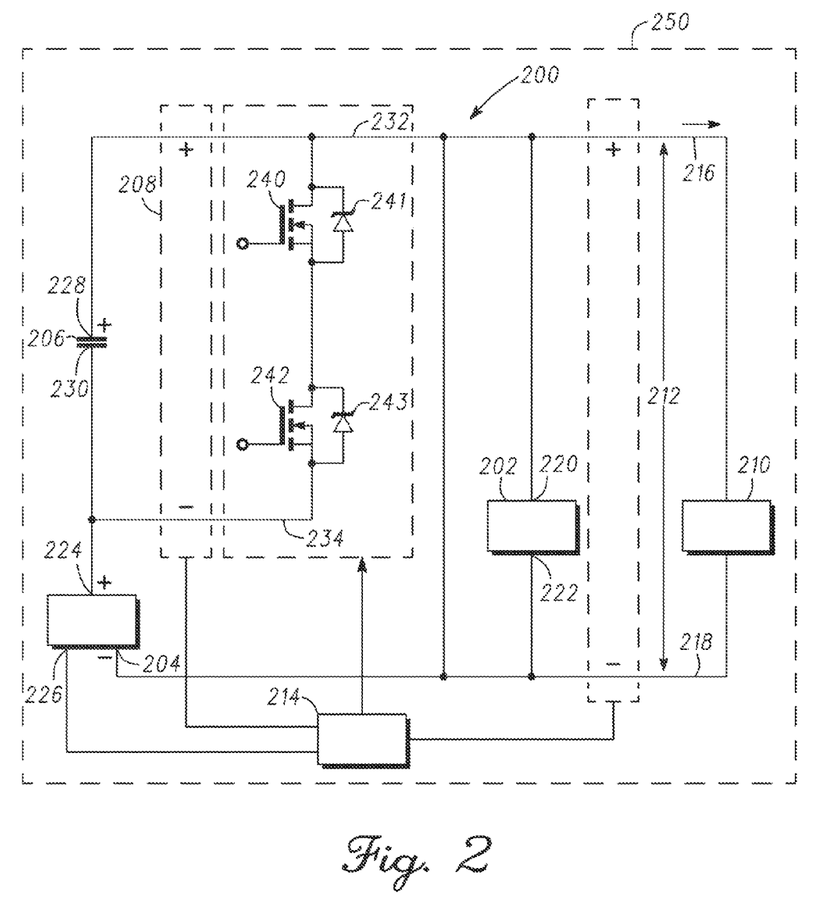
FIG. 2 is a schematic view of an electrical system suitable for use in a vehicle in accordance with another embodiment.

FIG. 2 depicts of an electrical system 200 suitable for use in a vehicle 250 in accordance with another embodiment. The electrical system 200 includes, without limitation, a fuel cell 202, an energy storage element 204, a capacitive element 206, a switching arrangement 208, an electrical load 210, and a control module 214. The various elements of the electrical system 200 are coupled to a bus 212. The elements of the electrical system 200 of FIG. 2 are similar to counterpart elements in the electrical system 100 of FIG. 1, and accordingly, these common elements will not be redundantly described in detail here in the context of FIG. 2. However, in the embodiment of FIG. 2, the capacitor 206 is realized as a non-polarized (or bipolar) capacitor. It should be understood that FIG. 2 is a simplified representation of an electrical system 200 for purposes of explanation and is not intended to limit the scope or applicability of the subject matter described herein in any way.

In the illustrated embodiment of FIG. 2, the switching arrangement 208 comprises a first switching element 240 coupled between a first terminal 228 of the capacitor 206 at node 232, which is also coupled to the positive rail 216 of the bus 212. In an exemplary embodiment, the first switching element 240 is configured to allow current flow from node 232 to node 236 when it is closed (or ON) and the voltage at node 232 is greater than the voltage at node 236. A first diode 241 is coupled between node 232 and node 236 and configured antiparallel to the first switching element 240, such that the first diode 241 allows current to flow from node 236 to node 232 when the first switching element 240 is open (or OFF) and the voltage at node 236 is greater than the voltage at node 232. A second switching element 242 is connected between node 236 and a second terminal 230 of the capacitor 206 at node 234, and the second switching element 242 is configured to allow current to flow from node 234 to node 236 when it is closed and the voltage at node 236 is less than the voltage at node 234. In this regard, the first switching element 240 may be realized as an N-type device and the second switching element 242 may be realized as a P-type device. A second diode 243 is connected between node 234 and node 236 and configured to allow current to flow from node 236 to node 234 when the second switching element 242 is open and the voltage at node 236 is greater than the voltage at node 234. In an alternative embodiment, the switching arrangement 208 may comprise a relay (e.g., a latching relay, a non-latching relay, a contactor, or another electromechanical switch) connected between nodes 232, 234 and configured to allow bidirectional current between nodes 232, 234 when the relay is closed (or ON).

Figure 3:
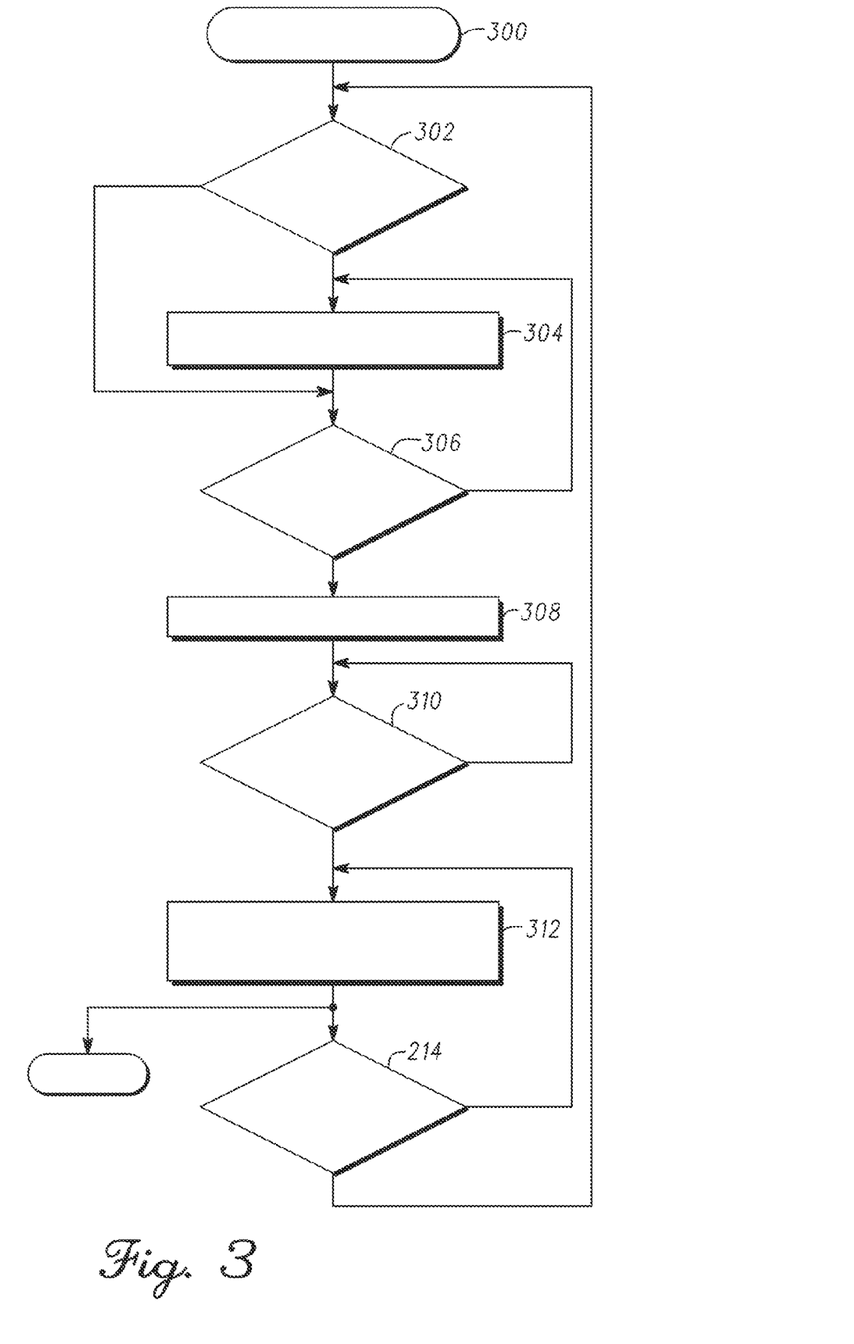
FIG. 3 is a flow diagram of a battery state of charge (SOC) management process suitable for use with the electrical system of FIG. 1 in accordance with one embodiment.

Referring now to FIG. 3, in an exemplary embodiment, an electrical system may be configured to perform a battery SOC management process 300 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the switching arrangement 108, 208, the electrical load 110, 210 and/or the control module 114, 214. It should be appreciated that any number of additional or alternative tasks may be included, and may be incorporated into a more comprehensive procedure or process having additional functionality not described in detail herein.

Referring to FIG. 3, and with continued reference to FIG. 1 and FIG. 2, a battery SOC management process 300 may be performed to maintain a battery state of charge (SOC) within a predetermined SOC range, that is, greater than or equal to a lower SOC limit and less than or equal to an upper SOC limit. In an exemplary embodiment, the battery SOC management process 300 initializes with the battery SOC being greater than a lower SOC limit and less than an upper SOC limit. The battery SOC management process 300 begins by determining whether the voltage across the capacitive element is greater than zero (task 302). In this regard, the control module 114, 214 is coupled to the capacitor 106, 206 or otherwise obtains the voltage potential ($V_C$) between node 132, 232 and node 134, 234.

When the voltage across the capacitive element is greater than zero, the battery SOC management process 300 continues by discharging the energy stored by the capacitive element based on the operating mode (task 304). For example, in the embodiment of FIG. 1, the control module 114 is coupled to the bus 112 and configured to determine the operating mode for the electrical system 100 based on the load current ($i_L$) on the bus 112. In this regard, the control module 114 may determine the electrical system 100 is in an energy delivery mode when the fuel cell 102 and/or battery 104 are delivering current to the load 110, that is, when current is flowing to the load 110 (e.g., $i_L$>0). To discharge the energy stored by the capacitor 106 and provide additional current to the load 110, the control module 114 operates the switching arrangement 108 by closing (or turning ON) the first switching element 140 and the fourth switching element 146 while maintaining the second switching element 142 and third switching element 144 in an open (or OFF) state. When the first switching element 140 and the fourth switching element 146 are closed, the capacitor 106 and the battery 104 are configured electrically in series between the rails 116, 118 of the bus 112. As a result, the combined capacitor voltage ($V_C$) and battery voltage ($V_B$) match the bus voltage and/or fuel cell voltage ($V_{FC}$). In other words, the sum of the capacitor voltage ($V_C$) and the battery voltage ($V_B$) is substantially equal to the fuel cell voltage ($V_{FC}$), neglecting the voltage drop across switching elements 140, 146. As the capacitor voltage discharges, the battery voltage ($V_B$) and fuel cell voltage ($V_{FC}$) fluctuate to maintain the desired current to the load 110.

Conversely, the control module 114 determines the electrical system 100 is in a regenerative mode (or recharging mode) when current is not flowing to the load 110 (e.g., $i_L$≤0), that is, when the load 110 is providing regenerative energy (e.g., from regenerative braking) to the electrical system 100 or is otherwise not receiving current from the fuel cell 102. To discharge the energy stored by the capacitor 106 and provide additional charging current to the battery 104, the control module 114 operates the switching arrangement 108 by closing (or turning ON) the second switching element 142 and the third switching element 144 while maintaining the first switching element 140 and fourth switching element 146 in an open state. When the second switching element 142 and the third switching element 144 are closed, the capacitor 106 and the battery 104 are electrically in series between the rails 116, 118 of the bus 112 but with opposite polarity, such that the capacitor voltage ($V_C$) is subtracted from the battery voltage ($V_B$) to match the bus voltage and/or fuel cell voltage ($V_{FC}$). In other words, the sum of the capacitor voltage ($V_C$) and fuel cell voltage ($V_{FC}$) is substantially equal to the battery voltage ($V_B$), neglecting any voltage drop across switching elements 142, 144. In this regard, in a regenerative mode, the sum of the capacitor voltage ($V_C$) and fuel cell voltage ($V_{FC}$) is greater than the open circuit voltage of the battery 104.

In the embodiment of FIG. 2, by virtue of the bipolar capacitor 206, the control module 214 opens the switching elements 240, 242, when the capacitor voltage is greater than zero and the battery SOC is greater than a lower SOC limit and less than an upper SOC limit, regardless of the operating mode. This causes the sum of the capacitor voltage ($V_C$) and the battery voltage ($V_B$) to be substantially equal to the fuel cell voltage ($V_{FC}$) and allows the capacitor voltage to be discharged to maintain equilibrium. Once the capacitor voltage is discharged, the control module 214 closes the switching elements 240, 242 (regardless of operating mode) to short circuit the capacitor 206. If the switching arrangement 208 comprises a relay between nodes 232, 234, the control module 214 opens the relay such that the capacitor 206 is configured electrically in series between the positive rail 216 of the bus 212 and the positive terminal 224 of the battery 204 to discharge the capacitor voltage and then closes the relay to short circuit the capacitor 206.

Referring again to FIG. 3, in an exemplary embodiment, the battery SOC management process 300 discharges the capacitive element while the voltage across the capacitive element is greater than zero and then short circuits the capacitive element once the voltage has been discharged to zero volts (tasks 306, 308). In this regard, for the embodiment of FIG. 1, when the voltage potential between node 132 and node 134 is equal to zero (within realistic and/or practical operating tolerances), the control module 114 operates the switching arrangement 108 by closing (or turning ON) all of the switching elements 140, 142, 144, 146 to short circuit the capacitor 106. When the switching elements 140, 142, 144, 146, are all closed, the positive terminal 124 of the battery 104 is coupled to the positive rail 116 of the bus 112 (e.g. via third diode 145 and first switching element 140 and/or fourth switching element 146 and second diode 143). As a result, the battery voltage ($V_B$) and fuel cell voltage ($V_{FC}$) are substantially equal and fluctuate to maintain the appropriate current to/from the load 110. For the embodiment of FIG. 2, the control module 214 closes the switching elements 240, 242 (or the relay between nodes 232, 234 in an alternative embodiment) such that the battery voltage ($V_B$) and fuel cell voltage ($V_{FC}$) are substantially equal (neglecting voltage drops across switching elements 240, 242 and/or diodes 241, 243) and fluctuate to maintain the appropriate current to/from the load 210.

Referring again to FIG. 3, in an exemplary embodiment, the battery SOC management process 300 continues by monitoring the SOC of the battery and charging the capacitive element in a manner that maintains the SOC of the battery between a lower SOC threshold value and an upper SOC threshold value (tasks 310, 312). In this regard, the lower SOC threshold value corresponds to a lower SOC limit which is a SOC the battery 104, 204 should not be discharged below, and the upper SOC threshold value corresponds to an upper SOC limit which is a SOC the battery 104, 204 should not be charged above. The difference between the upper SOC limit and the lower SOC limit defines the SOC swing of the battery 104, 204 during operation. As set forth above, the lower SOC limit is preferably about 50% and the upper SOC limit is preferably about 70% such that the SOC swing of the battery 104, 204 is limited to about 20%. It will be appreciated that limiting the SOC swing of the battery 104, 204 improves the reliability and/or longevity of the battery 104, 204.

In an exemplary embodiment, for the embodiment of FIG. 1, to maintain the SOC of the battery 104 within the lower and upper SOC limits, the control module 114 operates the switching arrangement 108 by opening (or turning OFF) the switching elements 140, 142, 144, 146 when the SOC of the battery 104 reaches either the upper or lower SOC threshold value. In this regard, when the switching elements 140, 142, 144, 146 are open, the capacitor 106 is connected electrically in series between the positive rail 116 of the bus 112 and the positive terminal 124 of the battery 104 via a pair of diodes (e.g., either diodes 143, 145 or diodes 141, 147) based on the bus voltage and/or fuel cell voltage, as described in greater detail below. This allows the voltage across terminals 124, 126 of the battery 104 to return to the open circuit voltage of the battery 104 and prevents charging and/or discharging of the battery 104 beyond the predetermined SOC limits.

For example, when the electrical system 100 is in an energy delivery mode (e.g., $i_L>0$), the control module 114 monitors the SOC of the battery 104 while the battery 104 discharges and provides current to the electrical load 110. When the SOC of the battery 104 is less than or equal to the lower SOC threshold value, the control module 114 opens the switching elements 140, 142, 144, 146, thereby allowing the battery 104 to charge the capacitor 106 via diode 145 and diode 143. In this regard, current flows from the positive terminal 124 of the battery 104 through diode 145 to the positive terminal 128 of the capacitor 106, thereby increasing the voltage across terminals 128, 130 which charges the capacitor 106. The capacitor voltage is effectively subtracted from the battery voltage (or added to the fuel cell voltage), such that the sum of the fuel cell voltage and the capacitor voltage is substantially equal to the open circuit voltage of the battery 104. As the voltage of the battery 104 returns to the open circuit voltage of the battery 104, the battery 104 ceases providing current to the electrical load 110, thereby maintaining its SOC. In this manner, operating the switching arrangement 108 by opening the switching elements 140, 142, 144, 146 prevents discharging the battery 104 below the lower SOC limit. It should be appreciated that in practice, the battery 104 may continue to be discharged until the capacitor 106 is fully charged, that is, when the capacitor voltage ($V_C$) is equal to the difference between the open circuit of the battery 104 and the bus voltage and/or fuel cell voltage ($V_{FC}$). In this situation, the lower SOC threshold value may be adjusted accordingly to account for the additional discharge in order to maintain the desired SOC swing (or lower SOC limit) for the battery 104.

Conversely, when the electrical system 100 is in a regenerative mode (e.g., $i_L<0$), the control module 114 monitors the state of charge of the battery 104 while the fuel cell 102 and/or electrical load 110 provide charging current to the battery 104. When the SOC of the battery 104 is greater than or equal to the upper SOC threshold value, the control module 114 opens the switching elements 140, 142, 144, 146, thereby allowing the battery 104 to charge the capacitor 106 via diode 141 and diode 147. In a regenerative mode, current flows from the positive rail 116 of the bus 112 through diode 141 to the positive terminal 128 of the capacitor 106, thereby increasing the voltage across the terminals 128, 130 of (or charging) the capacitor 106. As the electrical load 110 and/or fuel cell 102 charges the capacitor 106, the voltage of the battery 104 returns to its open circuit voltage. The capacitor voltage is effectively added to the battery voltage (or subtracted from the fuel cell voltage), such that the sum of the open circuit voltage of the battery 104 and the capacitor voltage is equal to the fuel cell voltage and/or bus voltage. In this manner, operating the switching arrangement 108 by opening the switching elements 140, 142, 144, 146 prevents charging the battery 104 above the upper SOC limit. As set forth above, it should be appreciated that in practice, the battery 104 may continue to be charged until the capacitor 106 is fully charged, in which case, the upper SOC threshold value may be adjusted accordingly to account for the additional charging in order to maintain the desired SOC swing for the battery 104.

For the embodiment of FIG. 2, to maintain the SOC of the battery 204 above the lower SOC limit, the control module 214 operates the switching arrangement 208 by opening (or turning OFF) the first switching element 240 and closing (or turning ON) the second switching element 242 when the SOC of the battery 204 reaches the lower SOC threshold value. In this regard, the SOC of the battery 204 will reach the lower SOC threshold value in an energy delivery mode, wherein the capacitor 206 is connected electrically in series between the positive rail 216 of the bus 212 and the positive terminal 224 of the battery 204. In the energy delivery mode, current flows from the positive terminal 224 of the battery 204 to the terminal 230 of the capacitor 206, thereby increasing the voltage from terminal 230 to terminal 228 of the capacitor 206 (e.g., $V_C<0$). Thus, the battery 204 to charges the capacitor 206 in a manner, such that the capacitor voltage is effectively subtracted from the battery voltage (or added to the fuel cell voltage). As a result, the sum of the fuel cell voltage and the capacitor voltage is substantially equal to the open circuit voltage of the battery 204. This allows the voltage across terminals 224, 226 of the battery 204 to return to the open circuit voltage of the battery 204 and prevents charging and/or discharging of the battery 204 below the lower SOC limit.

Conversely, to maintain the SOC of the battery 204 below the upper SOC limit, the control module 214 operates the switching arrangement 208 by opening (or turning OFF) the second switching element 242 and closing (or turning ON) the first switching element 240 when the SOC of the battery 204 reaches the upper SOC threshold value. In this regard, the SOC of the battery 204 will reach the upper SOC threshold value in a regenerative mode, wherein the capacitor 206 is connected electrically in series between the positive rail 216 of the bus 212 and the positive terminal 224 of the battery 204. In the regenerative mode, current flows from the positive rail 216 of the bus 212 to terminal 228 of the capacitor 206, thereby increasing the voltage from terminal 228 to terminal 230 of the capacitor 206. As the electrical load 210 and/or fuel cell 202 charges the capacitor 206, the voltage of the battery 204 returns to its open circuit voltage. The capacitor voltage is effectively added to the battery voltage (or subtracted from the fuel cell voltage), such that the sum of the open circuit voltage of the battery 204 and the capacitor voltage is equal to the fuel cell voltage and/or bus voltage. In this manner, the battery SOC management process 300 prevents charging the battery 204 above the upper SOC limit. In the embodiment where the switching arrangement 208 comprises a relay between nodes 232, 234, the control module 214 opens (or turns OFF) the relay such that the capacitor voltage is added and/or subtracted from the battery voltage as needed.

In an exemplary embodiment, the battery SOC management process 300 continues by determining whether there is a change in the operating mode, for example, from energy delivery mode to regenerative mode or vice versa (task 314). When the operating mode changes, the loop defined by tasks 302, 304, 306, 308, 210, 212 and 214 repeats as desired throughout operation of the electrical system 100. Whenever the capacitor voltage is greater than zero and the SOC of the battery 104, 204 is within the lower and upper SOC limits, the capacitor 106, 206 is discharged in a similar manner as set forth above (tasks 302, 304). It will be appreciated that this enhances the efficiency of the electrical system 100, 200 by ensuring any stored energy by the capacitor 106, 206 is utilized every time the operating mode changes. For example, if the electrical system 100, 200 is initially in an energy delivery mode, the fuel cell 102, 202 and battery 104, 204 will provide current to the electrical load 110, 210 until the lower SOC threshold value of the battery 104, 204 is reached (tasks 306, 308, 310). After reaching the lower SOC threshold value, the control module 114, 214 operates the switching arrangement 108, 208 to charge the capacitor 106, 206 allowing the battery voltage to return to the open circuit voltage and preventing further discharge of the battery 104, 204 (task 312). When the electrical system 100, 200 changes to a regenerative mode (e.g., regenerative braking), the control module 114, 214 operates the switching arrangement 108, 208 to discharge the capacitor 106, 206 and provide additional charging current to the battery 104, 204 until the capacitor is fully discharged (tasks 302, 304, 306, 314). After discharging the capacitor 106, 206 the control module 114, 214 operates the switching arrangement 108, 208 to short circuit the capacitor 106, 206 and charge the battery 104, 204 until reaching the upper SOC threshold value (tasks 308, 310). Once the upper SOC threshold value is reached, the control module 114, 214 operates the switching arrangement 108, 208 to charge the capacitor 106, 206, allowing the battery voltage to return to the open circuit voltage and preventing further charging of the battery 104, 204 (task 312). When the electrical system 100, 200 changes to an energy delivery mode, the control module 114, 214 operates the switching arrangement 108, 208 to discharge the capacitor 106, 206 and provide additional current to the electrical load 110, 210 until the capacitor 106, 206 is fully discharged (tasks 302, 304, 306, 314). After discharging the capacitor 106, 206 the control module 114, 214 operates the switching arrangement 108, 208 to short circuit the capacitor 106, 206 and discharge the battery 104, 204 until reaching the lower SOC threshold value, as set forth above (tasks 308, 310). The loop defined by tasks 302, 304, 306, 308, 210, 212 and 214 may repeat as desired throughout operation of the electrical system.

To briefly summarize, advantages of the system and/or method described above is that electrical system can provide the desired current and/or power during peak loading conditions while limiting the SOC swing of the battery, thereby improving the reliability and/or longevity of the battery. In addition, the systems and/or methods described above allow the battery to be coupled to the bus without requiring a DC/DC boost converter while maintaining the ability to limit the SOC swing of the battery. In addition, the battery voltage can be chosen to be any voltage between the idle voltage (or open cell) voltage of the fuel cell stack and the full load voltage of the fuel cell stack, and allows the use of smaller capacitors 106, 206 due to reduced power and/or energy handling requirements as compared to conventional battery/capacitor configurations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for operating an electrical system, the electrical system comprising a fuel cell coupled to a bus and a switching arrangement, the bus comprising a positive rail and a negative rail coupled to a negative battery terminal of a battery, the switching arrangement comprising a first switching element coupled between a positive capacitor terminal of a capacitive element and the positive rail and configured to allow current from the positive capacitor terminal to the positive rail when closed, a second switching element coupled between a negative capacitor terminal of the capacitive element and the positive rail and configured to allow current from the positive rail to the negative capacitor terminal when closed, a third switching element coupled between the positive capacitor terminal and a positive battery terminal of the battery and configured to allow current from the positive capacitor terminal to the positive battery terminal when closed, and a fourth switching element coupled between the negative capacitor terminal and the positive battery terminal and configured to allow current from the positive battery terminal to the negative capacitor terminal when closed, the method comprising:
   operating the switching arrangement such that a battery voltage of the battery is substantially equal to a fuel cell voltage of the fuel cell when a state of charge of the battery is greater than a lower threshold value and less than an upper threshold value;
   operating the switching arrangement to couple the capacitive element electrically in series between the battery and the bus when the state of charge of the battery is less than or equal to the lower threshold value; and
   operating the switching arrangement to couple the capacitive element electrically in series between the battery and the bus when the state of charge of the battery is greater than or equal to the upper threshold value.

2. The method of claim 1, wherein operating the switching arrangement such that the battery voltage is substantially equal to the fuel cell voltage comprises short circuiting the capacitive element when the state of charge of the battery is between the lower threshold value and the upper threshold value.

3. The method of claim 2, wherein operating the switching arrangement such that the battery voltage is substantially equal to the fuel cell voltage further comprises:
   when a voltage of the capacitive element is greater than zero and the state of charge of the battery is between the lower threshold value and the upper threshold value, discharging the capacitive element prior to short circuiting the capacitive element.

4. The method of claim 1, wherein:
   operating the switching arrangement to couple the capacitive element electrically in series between the battery and the bus when the state of charge of the battery is less than or equal to the lower threshold value comprises subtracting a voltage of the capacitive element from the battery voltage; and
   operating the switching arrangement to couple the capacitive element electrically in series between the battery and the bus when the state of charge of the battery is greater than or equal to the upper threshold value comprises adding a voltage of the capacitive element to the battery voltage.

5. An electrical system comprising:
   a bus comprising a positive rail and a negative rail;
   a battery having a positive battery terminal, and having a negative battery terminal coupled to the negative rail;
   a capacitive element having a positive capacitor terminal and a negative capacitor terminal;
   a first switching element coupled between the positive capacitor terminal and the positive rail, the first switching element being configured to allow current from the positive capacitor terminal to the positive rail when closed;
   a second switching element coupled between the negative capacitor terminal and the positive rail, the second switching element being configured to allow current from the positive rail to the negative capacitor terminal when closed;
   a third switching element coupled between the positive capacitor terminal and the positive battery terminal, the third switching element being configured to allow current from the positive capacitor terminal to the positive battery terminal when closed; and a fourth switching element coupled between the negative capacitor terminal and the positive battery terminal, the fourth switching element being configured to allow current from the positive battery terminal to the negative capacitor terminal when closed.

6. The electrical system of claim 5, further comprising:
a first diode coupled between the positive capacitor terminal and the positive rail, the first diode being configured to allow current from the positive rail to the positive capacitor terminal;
a second diode coupled between the negative capacitor terminal and the positive rail, the second diode being configured to allow current from the negative capacitor terminal to the positive rail;
a third diode coupled between the positive capacitor terminal and the positive battery terminal, the third diode being configured to allow current from the positive battery terminal to the positive capacitor terminal; and
a fourth diode coupled between the negative capacitor terminal and the positive battery terminal, the fourth diode being configured to allow current from the negative capacitor terminal to the positive battery terminal.

7. The electrical system of claim 5, further comprising a fuel cell having a positive fuel cell terminal coupled to the positive rail of the bus and a negative fuel cell terminal coupled to the negative rail of the bus.

8. The electrical system of claim 7, the capacitive element having a capacitor voltage between the positive capacitor terminal and the negative capacitor terminal, wherein the electrical system further comprises a control module coupled to the battery and the capacitive element, wherein the control module is configured to short circuit the capacitive element using at least one of the first switching element, the second switching element, the third switching element, and the fourth switching element when the capacitive element voltage is equal to zero and a state of charge of the battery is within a predefined range.

9. The electrical system of claim 8, further comprising:
a first diode coupled between the positive capacitor terminal and the positive rail of the bus, the first diode being configured to allow current from the positive rail to the positive capacitor terminal;
a second diode coupled between the negative capacitor terminal and the positive rail of the bus, the second diode being configured to allow current from the negative capacitor terminal to the positive rail;
a third diode coupled between the positive capacitor terminal and the positive battery terminal, the third diode being configured to allow current from the positive battery terminal to the positive capacitor terminal; and
a fourth diode coupled between the negative capacitor terminal and the positive battery terminal, the fourth diode being configured to allow current from the negative capacitor terminal to the positive battery terminal.

10. The electrical system of claim 9, wherein the control module is coupled to the first switching element, the second switching element, the third switching element, and the fourth switching element, and the control module is configured to open the first switching element, the second switching element, the third switching element, and the fourth switching element when the state of charge of the battery is not within the predefined range.

11. The electrical system of claim 8, the control module being coupled to the first switching element, the second switching element, the third switching element, and the fourth switching element, wherein in response to a change in operating mode, the control module is configured to:
discharge the capacitive element by closing the first switching element and the fourth switching element when the state of charge of the battery is greater than a lower threshold value; and
discharge the capacitive element by closing the second switching element and the third switching element when the state of charge of the battery is less than an upper threshold value.

12. The electrical system of claim 7, wherein an open circuit voltage of the battery is less than an open circuit voltage of the fuel cell, and greater than a voltage of the fuel cell under full load.

13. The electrical system of claim 7, wherein the capacitive element comprises an ultracapacitor.

14. The electrical system of claim 7, further comprising an electric drive unit coupled to the bus, the electric drive unit being configured to:
receive current from the bus in a first operating mode; and
provide current to the bus in a second operating mode.

15. The electrical system of claim 5, further comprising:
a switching arrangement comprising the first switching element, the second switching element, the third switching element, and the fourth switching element; and
a control module coupled to the switching arrangement and the battery, wherein the control module is configured to:
operate the switching arrangement such that a voltage of the battery is substantially equal to a voltage of the rail of the bus when a state of charge of the battery is greater than a lower threshold value and less than an upper threshold value;
operate the switching arrangement to add a voltage of the capacitive element to the voltage of the battery when the state of charge of the battery is greater than the upper threshold value; and
operate the switching arrangement to subtract the voltage of the capacitive element from the voltage of the battery when the state of charge of the battery is less than the lower threshold value.

16. The electrical system of claim 15, wherein the switching arrangement comprises:
a first node coupled to the positive capacitor terminal of the capacitive element;
a second node coupled to the negative capacitor terminal of the capacitive element;
a third node coupled to the positive rail of the bus, the first switching element being coupled between the first node and the third node to allow current from the first node to the third node when the first switching element is closed and the second switching element being coupled between the second node and the third node to allow current from the third node to the second node when the second switching element is closed;
a fourth node coupled to the battery, the third switching element being coupled between the first node and the fourth node to allow current from the first node to the fourth node when the third switching element is closed and the fourth switching element being coupled between the second node and the fourth node to allow current from the fourth node to the second node when the fourth switching element is closed;
a first diode coupled between the first node and the third node, the first diode being configured antiparallel to the first switching element;

a second diode coupled between the second node and the third node, the second diode being configured antiparallel to the second switching element;

a third diode coupled between the first node and the fourth node, the third diode being configured antiparallel to the third switching element; and a fourth diode coupled between the second node and the fourth node, the fourth diode being configured antiparallel to the fourth switching element.

17. The electrical system of claim 16, wherein the control module is configured to:

open the first switch, the second switch, the third switch, and the fourth switching element when the state of charge of the energy storage element is less than or equal to the lower threshold value; and open the first switch, the second switch, the third switch, and the fourth switching element when the state of charge of the energy storage element is greater than or equal to the upper threshold value.

18. The electrical system of claim 16, wherein the control module is configured to:

close the first switching element and the fourth switching element when the voltage of the capacitive element is greater than zero and the state of charge of the energy storage element is greater than or equal to the lower threshold value in a first operating mode; and close the second switching element and the third switching element when the voltage of the capacitive element is greater than zero and the state of charge of the energy storage element is less than or equal to the upper threshold value in a second operating mode.

* * * * *